(12) United States Patent
Kleckner et al.

(10) Patent No.: US 8,333,093 B2
(45) Date of Patent: Dec. 18, 2012

(54) METHOD AND DEVICE FOR PRODUCING BENT SPRING ELEMENTS

(75) Inventors: Josef Kleckner, Leonberg (DE); Julius Mazurkiewicz, Diest (BE); Paul Criel, St. Truiden (BE)

(73) Assignee: Robert Bosch GmbH, Stuttgart (DE)

( * ) Notice: Subject to any disclaimer, the term of this patent is extended or adjusted under 35 U.S.C. 154(b) by 1165 days.

(21) Appl. No.: 12/159,052

(22) PCT Filed: Nov. 17, 2006

(86) PCT No.: PCT/EP2006/068603
§ 371 (c)(1),
(2), (4) Date: Jun. 24, 2008

(87) PCT Pub. No.: WO2007/080023
PCT Pub. Date: Jul. 19, 2007

(65) Prior Publication Data
US 2008/0302157 A1 Dec. 11, 2008

(30) Foreign Application Priority Data
Dec. 29, 2005 (DE) .................. 10 2005 062 860

(51) Int. Cl.
*B21F 11/00* (2006.01)
(52) U.S. Cl. .............. 72/132; 72/203; 72/160
(58) Field of Classification Search .......... 72/203, 72/127, 132, 160, 161, 164, 166, 168, 205
See application file for complete search history.

(56) References Cited

U.S. PATENT DOCUMENTS

| | | | |
|---|---|---|---|
| 4,249,406 A | | 2/1981 | Anderson |
| 4,739,490 A | | 4/1988 | Hayashi et al. |
| 4,891,963 A | * | 1/1990 | Reumann .................. 72/203 |

(Continued)

FOREIGN PATENT DOCUMENTS

DE 10115047 10/2002

(Continued)

OTHER PUBLICATIONS

Machine Translation of DE10115047 (Reference Published Oct. 2, 2002).*

(Continued)

*Primary Examiner* — Dana Ross
*Assistant Examiner* — Pradeep C Battula
(74) *Attorney, Agent, or Firm* — Michael Best & Friedrich LLP

(57) ABSTRACT

The invention is based on a method of producing bent spring elements from a spring steel strip (14), wherein a feed unit (16) delivers the spring steel strip (14) from a supply roll (12) to a bending unit (32) having at least three bending rollers (34) and a reverse bending roller (36), of which at least one bending roller (34) and the reverse bending roller (36) can be adjusted transversely to the spring steel strip (14) by bending motors (60, 62), and wherein a cutting-off unit (44) adjoins the bending unit (32), said cutting-off unit (44) cutting off the spring steel strip (14) into individual spring elements by means of cutting-off tools (46, 48; 76, 78). It is proposed that the cutting-off tools (46, 48; 76, 78) be movable in the longitudinal direction of the spring steel strip (14) in a numerically controlled manner and that they be synchronized with the feed movement of the spring steel strip (14) during the cutting-off operation.

19 Claims, 2 Drawing Sheets

U.S. PATENT DOCUMENTS

| | | | | |
|---|---|---|---|---|
| 5,063,801 A | * | 11/1991 | Wallis | 83/37 |
| 6,134,999 A | * | 10/2000 | Herman | 83/35 |
| 6,229,674 B1 | * | 5/2001 | Todd | 360/261.1 |
| 7,013,547 B2 | | 3/2006 | Lenzen et al. | |
| 7,076,979 B2 | * | 7/2006 | Wilhelm et al. | 72/11.8 |
| 2006/0230809 A1 | * | 10/2006 | Luthi et al. | 72/405.13 |

FOREIGN PATENT DOCUMENTS

| | | |
|---|---|---|
| JP | 52019157 | 2/1977 |
| JP | 55153700 | 11/1980 |
| JP | 57107724 | 7/1982 |
| JP | 61078518 | 4/1986 |
| JP | 62074523 | 4/1987 |
| JP | 62134613 | 8/1987 |
| JP | 63176587 | 11/1988 |
| JP | 6075736 | 9/1994 |
| JP | 7171628 | 7/1995 |
| JP | 7185671 | 7/1995 |
| JP | 11010241 | 1/1999 |
| JP | 11169955 | 6/1999 |
| JP | 2001162326 | 6/2001 |
| JP | 2003211227 | 7/2003 |
| RU | 2320444 C2 | 3/2008 |
| SU | 602253 | 4/1978 |
| SU | 1680406 A1 | 9/1991 |
| WO | 99/52753 | 10/1999 |

OTHER PUBLICATIONS

PCT/EP2006/068603 International Search Report.

* cited by examiner

METHOD AND DEVICE FOR PRODUCING BENT SPRING ELEMENTS

BACKGROUND OF THE INVENTION

The invention is based on a method and a device for producing bent spring elements.

DE 198 16 609 A1 discloses a method and a device for producing flat-beam wipers for vehicles with bent spring elements, so-called flat beams. Said flat beams form the support element of the wiper blade and preferably have a material thickness which varies over the length. Said flat beams are produced from a tempered spring steel strip which is supplied by two feed rollers, which are arranged in a pair, via guide rollers to a bending unit at a continuous feed rate. The bending unit comprises a cutting unit which serves to cut the individual support elements from one another after they are bent. The continuous feed movement is briefly interrupted during the cutting process.

In the bending unit, the spring steel strip is bent firstly in the one direction by three points of contact and is bent back by a small percentage by a subsequent contact point. The degree of reverse bending which is necessary in order to ensure the dimensional stability of the bent support element is determined empirically. As a mean value, depending on the quality of the spring steel strip, a degree of reverse bending of approximately 10% to 40% of the bending which has previously taken place has proven to be effective. The first two contact points in the feed direction of the bending unit are formed by bending rollers, while the third contact point is a cutting edge which interacts with a cutting blade and cuts the finished support element from the spring steel strip. The bending rollers can be adjusted toward and away from the spring steel strip by actuating motors. A predetermined bending of the spring steel strip is generated corresponding to the position of the bending rollers. Actuating rollers are activated by an electronic control unit as a function of various influential variables in a program-controlled manner.

DE 101 15 047 A1 also disclose a method and a device for producing bent spring strip sections. The device comprises a feed unit which supplies a spring steel strip from a supply roll to a bending unit. Provided between the feed unit and the bending unit is an alignment apparatus. The bending unit comprises three bending rollers and a reverse bending roller, of which one bending roller and the reverse bending roller can be adjusted transversely with respect to the spring steel strip by means of an actuating device. The bending unit is adjoined by a cutting unit which is connected to an NC control unit and cuts the individual spring strip sections from the spring steel strip. During the cutting process, the spring strip feed is briefly stopped.

SUMMARY OF THE INVENTION

According to the invention, the feed of the spring steel strip is not interrupted. This is possible in that the cutting tools can be moved in the longitudinal direction of the spring steel strip in a numerically controlled fashion and are synchronized with the feed movement of the spring steel strip during the cutting process. The uniform feed speed results in a likewise uniform bending profile in the bending unit, which has a positive effect on the properties of the bent spring elements. In contrast, the known devices operate with a start-stop system with very different speeds and high levels of acceleration during a feed and bending process, in particular if large unit quantities are to be produced per unit time. The intermittent feed loads the components and leads to increased wear. As a result of the continuous feed movement, better interaction of the drive motors with one another takes place, so that less wear occurs and a higher output is possible. In addition, it is possible to dispense with so-called trigger holes in the spring steel strip for the control of the process. Said trigger holes can lead to large length differences and bending inaccuracies.

In a device for carrying out the method, the cutting tools are arranged so as to be adjustable relative to the spring steel strip in the longitudinal direction of the feed movement of said spring steel strip, with the adjusting movement of said cutting tools being synchronized with the feed movement of the spring steel strip during the cutting process by means of an electronic control unit. Here, it is possible for the cutting tools together with the cutting unit to be adjustable relative to the spring steel strip in the longitudinal direction of the feed movement of said spring steel strip, or for the cutting tools to be arranged in a stationary housing of the cutting unit, in which said cutting tools are adjustable relative to the housing and relative to the spring steel strip in the longitudinal direction of the feed movement of said spring steel strip. The second alternative is simpler to implement, and the cutting tools can be activated in a more precise fashion.

A roller guide serves to guide the spring steel strip between the bending unit and the cutting tools, the rollers of which roller guide can be pneumatically adjusted onto the spring steel strip. It is also expediently possible for some guide rollers in the region of the cutting tools to be varied in terms of their position with respect to one another in the longitudinal direction in such a way that their spacings to one another are increased or decreased as a function of the movement of the cutting tools in the longitudinal direction. The adjustment of the cutting tools in the longitudinal direction of the spring strip results in different spacings between the bending unit and the cutting tools. It is therefore advantageous if some guide rollers can adapt to said different spacing and can be distributed over the spacing without excessive gaps.

In order to be able to produce many different lengths and bends, it is advantageous to arrange the cutting tools in a stationary housing in which a defined zero point position is determined for the cutting tools which move in the longitudinal position. In order to be able to set the bending unit to the respective type of spring elements at the zero point of the cutting unit, it is expedient to design said bending unit to likewise be adjustable in the longitudinal direction. The adjustment to a spring element type can take place manually when setting up the device. Said bending unit can advantageously also be adjusted in a motor-driven fashion by means of a spindle drive. It is thereby possible for the adjustment to be incorporated into an automatic set-up process. It is also expedient to adjust not only the bending unit in the longitudinal direction but also to combine the bending unit with the feed unit and at least one NC measuring wheel into a structural unit which is adjustable in the longitudinal direction.

In order to obtain precise bends, the travels of the adjustable bending rollers and of the reverse bending roller must be precisely determined. For this purpose, it is expedient for the bending roller supports on which the bending rollers are mounted to be adjusted substantially without play by means of bending motors via spindles. Here, the travel or adjustment travel can be determined, taking into consideration the setpoint values of an electronic control unit, by a rotating incremental encoder if the bending motors are for example CNC bending motors. The travel of the bending roller supports can also advantageously be determined by means of an absolute measured value encoder which is integrated in the form of software. Said absolute measured value encoder can for example comprise a glass scale with a sensor. Said absolute measured value encoder is suitable both for CNC bending motors and also for bending motors which are formed as linear motors.

For the extraction of the finished spring elements, it is advantageous for the cutting unit to be adjoined by an ejection device which is driven and which can be activated by means of the electronic control unit. Here, it is expedient for the spring element which is to be cut off to extend a short distance beyond the cutting tools in the feed direction, so that it can be easily gripped by the ejection device.

The spring steel strip is rolled on a supply roll, with the diameter of the supply roll and therefore the bending of the spring steel strip varying during the course of production. In order that it is possible to substantially assume uniform pre-conditions in the bending unit, it is proposed that a pre-bending unit is provided upstream of the bending unit. Said pre-bending unit is controlled as a function of the diameter of the supply roll and for example of the thickness of the spring steel strip in such a way that, during production, uniform run-in conditions are generated at the bending station regardless of the varying diameter of the supply roll.

For the production of spring elements, further processing steps are often necessary, for example the inscription or attachment of labels. In order to be able to carry out said machining steps in the same production process, it is expedient to arrange a processing unit upstream of the bending unit, the tools of which processing unit are movable in the longitudinal direction and, during the action time, are synchronized with the feed movement. Said tools, which normally entail an interruption in the feed movement, can therefore be used without an interruption in the feed movement of the spring steel strip.

BRIEF DESCRIPTION OF THE DRAWINGS

Further advantages can be gathered from the following description of the drawing. The drawing illustrates exemplary embodiments of the invention. The drawing, the description and the claims contain numerous features in combination. A person skilled in the art will expediently also consider the features individually and combine them to form further expedient combinations. In the drawing:

DETAILED DESCRIPTION

Figure 1:
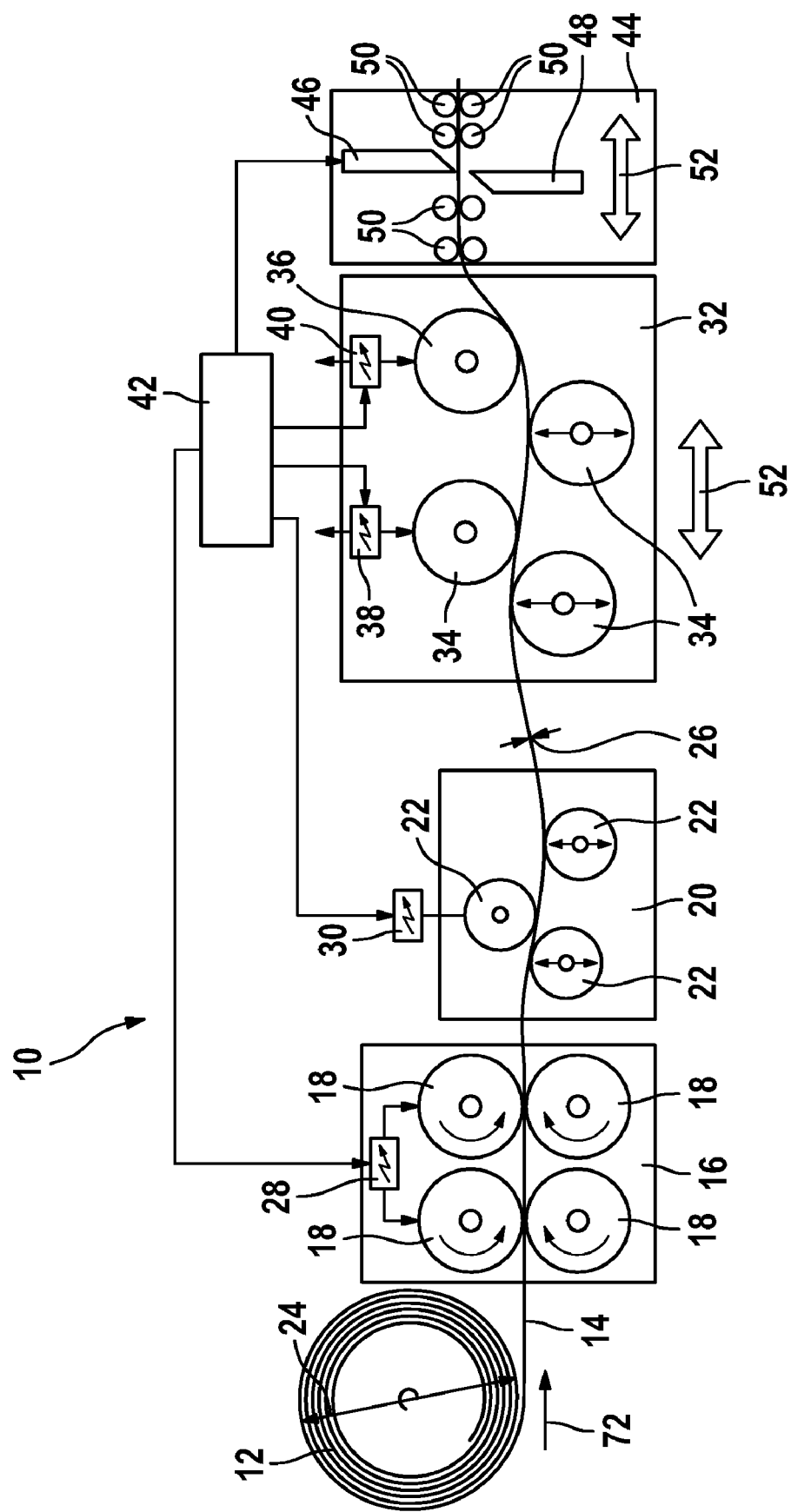
FIG. 1 is a schematic illustration of a device according to the invention.

A device 10 according to the invention comprises substantially a feed unit 16, a bending unit 32 and a cutting unit 44. The feed unit 16 has at least two feed rollers 18 which are situated opposite one another and between which a spring steel strip 14 is guided through. The feed rollers 18 which are adjusted and driven by means of an actuating device 28 feed the spring steel strip 14 from a supply roll 12 to the bending unit 32. In the latter, three bending rollers 34 are arranged with respect to one another in such a way that the spring steel strip 14 is bent with a predefined curvature. At least one of the bending rollers 34 can be adjusted transversely with respect to the longitudinal direction 52 of the spring steel strip 14 by means of an actuating device 38, so that the bend curvature can be varied. In the feed direction 72 of the spring steel strip 14, the three bending rollers 34 are followed by a reverse bending roller 36 which can be adjusted transversely with respect to the longitudinal direction 52 of the spring steel strip 14 by means of an actuating device 40. By means of the reverse bending roller 36, the spring steel strip 14 is bent back by a certain degree in order to give the finished product a greater degree of stability. The reverse bending of the spring steel strip 14 is taken into consideration by a correspondingly more intense forward bending at the three bending rollers 34.

In the adjoining cutting unit 44, a fully-bent spring element is cut from the spring steel strip 14 by an upper cutting tool 46 and a lower cutting tool 48. For easier cutting, the spring element is pressed elastically into straight form by guide rollers 50. The cutting tools 46, 48 are movable in the longitudinal direction 52 so that their cutting edges can move relative to the spring steel strip 14 in the longitudinal direction 52. During the cutting movement of the cutting tools 46, 48, the longitudinal movement of the cutting tools 46, 48 is synchronized with the feed movement of the spring steel strip 14, so that a precise cut is possible. The movements of the cutting tools 46, 48 and of the bending rollers 34, 36 and of the feed rollers 18 are coordinated with one another by an electronic control unit 42 as a function of relevant process parameters. In order to compensate the dynamic inertial forces during the actuation of the cutting tools 46, 48, it is expedient for compensating masses to be provided which run counter to the cutting tools 46, 48. The smooth running of the cutting tools 46, 48 has a favorable effect on the guidance and the feed of the spring steel strip 14.

Figure 2:
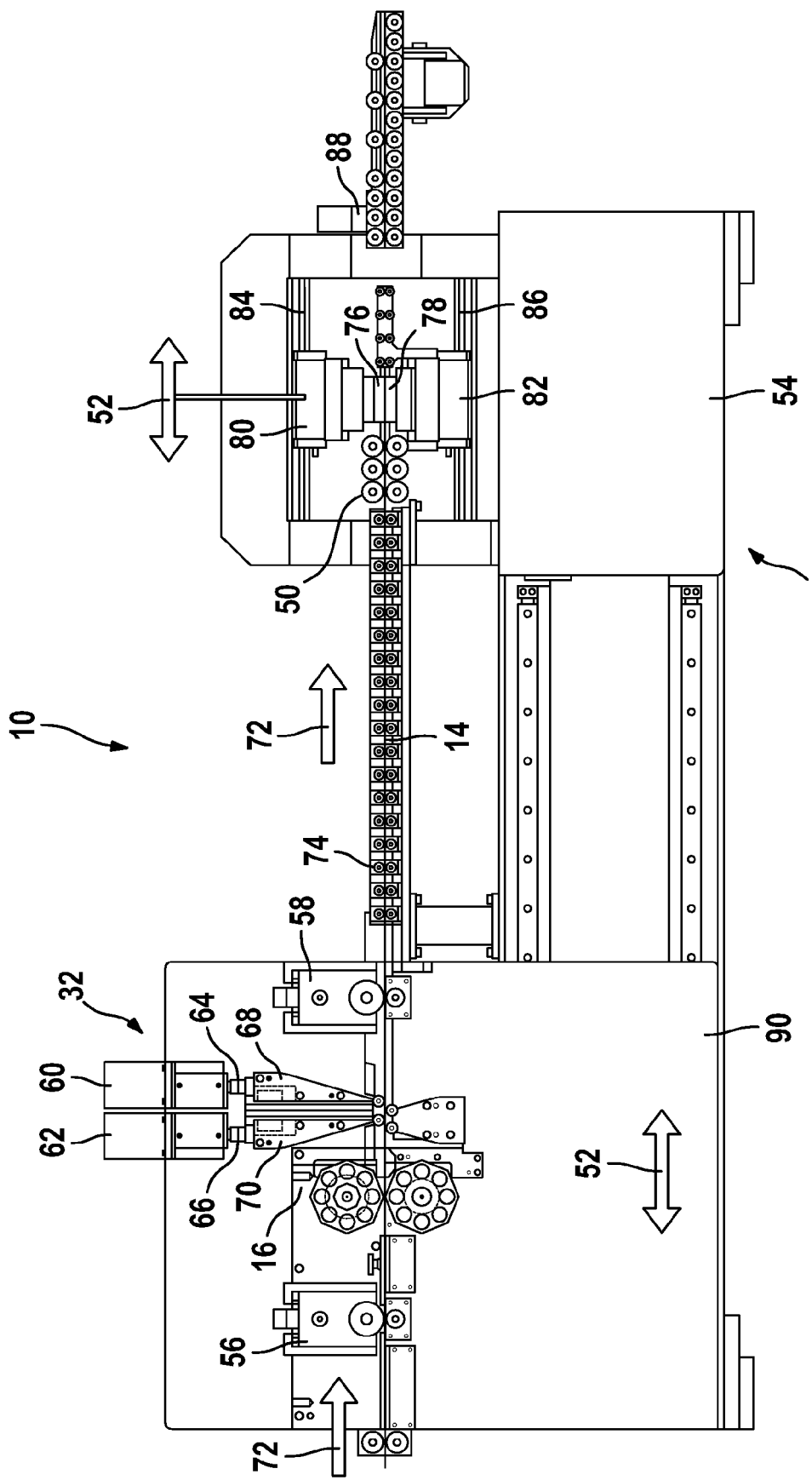
FIG. 2 shows a variant of FIG. 1.

The cutting tools 46, 48 can be adjusted together with the cutting unit in the longitudinal direction 52 or, in the case of a positionally fixed cutting unit 44, can be adjusted relative to a housing 54 (FIG. 2). Corresponding to the adjustment of the cutting tools 46, 48, the guide rollers 50 vary their spacings to one another, so that said guide rollers 50 are distributed approximately uniformly over the guide path.

Provided between the feed unit 16 and the bending unit 32 is a pre-bending unit 20 which has three bending rollers 22, of which one can be adjusted transversely with respect to the longitudinal direction 52 of the spring steel strip 14 by means of an actuating device 30. The adjustment takes place by means of the electronic control unit 42 as a function of the diameter 24 of the supply roll 12 and the thickness 26 of the spring steel strip 14. The pre-bending unit 20 serves to compensate the different degrees of bending of the spring steel strip 14 as a result of the different diameter 24 during the production process using simple means, so that a complex alignment unit can be dispensed with.

In the embodiment as per FIG. 2, the feed unit 16, the bending unit 32 and two NC measuring wheels 56, 58 are combined to form a structural unit 90 which is adjustable in the longitudinal direction 52 and which can therefore vary its position with respect to the cutting unit 44. The adjustment of the structural unit 90 can take place manually. Said adjustment can however also take place in a motor-driven fashion by means of a spindle drive, with it being possible for the adjustment process to be part of an automatic set-up process. The NC measuring wheel 56 serves to measure the slip of the pulled spring steel strip 14 and the NC measuring wheel 58 serves to measure the slip of the pushed spring steel strip 14. The measuring wheels 56, 58 measure the feed precisely, with the second measuring wheel 58 monitoring the first measuring wheel 56 and the feed path situated between the two. It is advantageous for the second measuring wheel 58 to be attached to the outer side of the housing 54 of the cutting unit 44.

In the bending unit 32, the upper bending roller 34 is mounted on a bending roller support 70 which can be adjusted by a bending motor 62 via a spindle 66. In addition, the reverse bending roller 36 is mounted on a bending roller support 68, with the bending roller support 68 being adjusted by a bending motor 60 via a spindle 64. The adjustment of said actuating devices is very precise and virtually play-free.

Between the bending unit 32 and the cutting unit 44, the spring steel strip 14 is guided through a roller guide 74 whose guide rollers can be pneumatically adjusted onto the spring steel strip 14.

The cutting unit 44 as per FIG. 2 is formed by a press whose upper punching tool 76 is mounted on an upper tool carriage 80 which is guided so as to be movable in the longitudinal direction 52 in a housing 54 of the cutting unit 44 by means of carriage guides 84, 86. Correspondingly, a lower punching tool 78 is mounted on a lower tool carriage 82 which itself is guided so as to be movable in the longitudinal direction 52 in the housing 54 on a carriage guide 86. Since the guide rollers 50 in the region of the punching tools 76, 78 must bridge a different guide path depending on the position in which the punching tools 76, 78 are situated, said guide rollers 50 can be moved apart from one another in a telescopic fashion, so that greater or smaller spacings are generated between the guide rollers 50 depending on the position of the punching tools 76, 78. The punching tools 76, 78, which function here as cutting tools, can likewise interact with compensating masses.

Situated at the end of the device 10 in the feed direction 72 is an ejection device 88 which is driven and can be activated by the electronic control unit 42. Said ejection device 88 grasps that end of the fully-bent spring element which projects beyond the punching tools 76, 78, and places said spring element into a storage container after the cutting process.

The invention claimed is:

1. A method for producing bent spring elements from a spring steel strip (14), the method comprising providing a device with a feed unit (16) delivering the spring steel strip (14) from a supply roll (12) to a bending unit (32) having at least three bending rollers (34) and a reverse bending roller (36), of which at least one bending roller (34) and the reverse bending roller (36) can be adjusted transversely with respect to the spring steel strip (14) by bending roller movement devices, and with the bending unit (32) being connected to a cutting unit (44) which cuts the spring steel strip (14) into individual spring elements by means of cutting tools (46, 48; 76, 78), characterized in that the cutting tools (46, 48; 76, 78) can be moved in the longitudinal direction of the spring steel strip (14) in a numerically controlled fashion and are synchronized with the feed movement of the spring steel strip (14) during the cutting process, the cutting unit (44) having an upper cutting tool (46) and a lower cutting tool (48), between which the spring steel strip (14) is guided, the cutting tools (46, 48; 76, 78) being adjustable relative to the spring steel strip (14) in the longitudinal direction (52) of the feed movement of said spring steel strip (14), and using an electronic control unit (42) to synchronize the adjusting movement of said cutting tools (46, 48; 76, 78) with the feed movement of the spring steel strip (14) during the cutting process, wherein some guide rollers (50) in the region of the cutting tools (46, 48; 76, 78) can be varied in terms of their position with respect to one another in the longitudinal direction (52) in such a way that their spacings to one another are increased or decreased as a function of the movement of the cutting tools (46, 48; 76, 78) in the longitudinal direction (52).

2. A device (10) for producing bent spring elements from a spring steel strip (14), the device comprising a feed unit (16) delivering the spring steel strip (14) from a supply roll (12) to a bending unit (32) having at least three bending rollers (34) and a reverse bending roller (36), of which at least one bending roller (34) and the reverse bending roller (36) can be adjusted transversely with respect to the spring steel strip (14) by bending roller movement devices, and with the bending unit (32) being connected to a cutting unit (44) which cuts the spring steel strip (14) into individual spring elements by means of cutting tools (46, 48; 76, 78), wherein the cutting tools (46, 48; 76, 78) can be moved in the longitudinal direction of the spring steel strip (14) in a numerically controlled fashion and are synchronized with the feed movement of the spring steel strip (14) during the cutting process, the cutting unit (44) having an upper cutting tool (46) and a lower cutting tool (48), between which the spring steel strip (14) is guided, characterized in that the cutting tools (46, 48; 76, 78) are arranged so as to be adjustable relative to the spring steel strip (14) in the longitudinal direction (52) of the feed movement of said spring steel strip (14), with the adjusting movement of said cutting tools (46, 48; 76, 78) being synchronized with the feed movement of the spring steel strip (14) during the cutting process by means of an electronic control unit (42), wherein a roller guide (74) is provided downstream of the bending unit (32), the rollers of which roller guide (74) can be pneumatically adjusted onto the spring steel strip (14).

3. The device (10) as claimed in claim 2, characterized in that the cutting tools (46, 48; 76, 78) together with the cutting unit (44) are adjustable relative to the spring steel strip (14) in the longitudinal direction (52) of the feed movement of said spring steel strip (14).

4. The device (10) as claimed in claim 2, characterized in that the cutting tools (46, 48; 76, 78) are arranged in a stationary housing (54) of the cutting unit (44), in which said cutting tools (46, 48; 76, 78) are adjustable relative to the housing (54) and relative to the spring steel strip (14) in the longitudinal direction (52) of the feed movement of said spring steel strip (14).

5. The device (10) as claimed in claim 4, characterized in that the cutting tools are an upper punching tool (76) and a lower punching tool (78) which are mounted on an upper tool carriage (80) and on a lower tool carriage (82) respectively, with the tool carriages (80, 82) being guided on carriage guides (84, 86) in the housing (54) in the longitudinal direction (52).

6. The device (10) as claimed in claim 2, characterized in that some guide rollers (50) in the region of the cutting tools (46, 48; 76, 78) can be varied in terms of their position with respect to one another in the longitudinal direction (52) in such a way that their spacings to one another are increased or decreased as a function of the movement of the cutting tools (46, 48; 76, 78) in the longitudinal direction (52).

7. The device (10) as claimed in claim 2, characterized in that the cutting unit (44) is adjoined by an ejection device (88) which is driven and which can be activated by the electronic control unit (42).

8. The device (10) as claimed in claim 2, characterized in that the bending unit (32), the feed unit (16) and at least one NC measuring wheel (56, 58) are combined to form a structural unit (90) which can be adjusted in the longitudinal direction (52).

9. The device (10) as claimed in claim 8, characterized in that the structural unit (90) can be adjusted in a motor-driven fashion by means of a motor-driven spindle drive, with the adjustment process being part of an automatic set-up process.

10. The device (10) as claimed in claim 2, characterized in that a pre-bending unit (20) is provided upstream of the bending unit (32).

11. The device (10) as claimed in claim 2, characterized in that the bending roller movement devices comprise bending motors (60, 62).

12. The device (10) as claimed in claim 11, characterized in that at least one of the bending rollers (34) is mounted on a bending roller support (70) and the reverse bending roller (36) is mounted on a bending roller support (68), with the bending roller supports (68, 70) being adjusted by the bending motors (60, 62) via spindles (64, 66).

13. The device (10) as claimed in claim 12, characterized in that the bending motors (60, 62) are CNC bending motors, with the travel of the bending roller supports (68, 70) being determined, taking into consideration the set-point values of the control unit (42), by a rotating incremental encoder.

14. The device (10) as claimed in claim 13, characterized in that the travel of the bending roller supports (68, 70) is determined by an absolute measured value encoder which is integrated in the form of software.

15. The device (10) as claimed in claim 14, characterized in that the absolute measured value encoder comprises a glass scale with a sensor.

16. The device (10) as claimed in claim 15, characterized in that two NC measuring wheels (56, 58) are provided, of which a first (56) is arranged in the feed direction (72) upstream of the bending unit (32) and a second (58) is arranged downstream of the bending unit (32).

17. The device (10) as claimed in claim 16, characterized in that the second NC measuring wheel (58) is arranged on the housing (54) of the cutting unit (44).

18. The device (10) as claimed in claim 12, characterized in that the bending motors (60, 62) are linear motors.

19. The device (10) as claimed in claim 2, characterized in that the bending unit (32) is adjoined by the cutting unit (44).

* * * * *